US008213459B2

(12) United States Patent
Breau et al.

(10) Patent No.: US 8,213,459 B2
(45) Date of Patent: Jul. 3, 2012

(54) SYSTEMS AND METHOD FOR ESTABLISHING A DATA-PATH BETWEEN A MOBILE STATION AND A HOME ACCESS SERVICE NETWORK GATEWAY

(75) Inventors: Jeremy R. Breau, Leawood, KS (US); Len I. Mosley, Herndon, VA (US); Oias T. Choksi, Herndon, VA (US); Chunmei Liu, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 122 days.

(21) Appl. No.: 12/508,715

(22) Filed: Jul. 24, 2009

(65) Prior Publication Data
US 2011/0022504 A1 Jan. 27, 2011

(51) Int. Cl.
*H04L 12/66* (2006.01)
*H04J 12/56* (2006.01)
*H04J 3/22* (2006.01)
*G07F 19/00* (2006.01)

(52) U.S. Cl. ........... 370/466; 370/352; 370/401; 705/34

(58) Field of Classification Search ................. 370/466, 370/352, 401
See application file for complete search history.

(56) References Cited

U.S. PATENT DOCUMENTS

| 7,706,401 | B2 * | 4/2010 | Bae et al. | 370/466 |
|---|---|---|---|---|
| 2004/0106393 | A1 * | 6/2004 | Chowdhury et al. | 455/406 |
| 2004/0213260 | A1 * | 10/2004 | Leung et al. | 370/395.3 |
| 2008/0104192 | A1 | 5/2008 | Xie | |
| 2008/0183604 | A1 * | 7/2008 | Chou | 705/30 |
| 2010/0011426 | A1 * | 1/2010 | Falk et al. | 726/7 |
| 2010/0208659 | A1 * | 8/2010 | Liebhart | 370/328 |
| 2010/0238867 | A1 * | 9/2010 | Li et al. | 370/328 |
| 2010/0263026 | A1 * | 10/2010 | Huo et al. | 726/4 |
| 2010/0293293 | A1 * | 11/2010 | Beser | 709/238 |
| 2010/0299423 | A1 * | 11/2010 | Kroeselberg | 709/223 |
| 2010/0325714 | A1 * | 12/2010 | Iyer et al. | 726/8 |

OTHER PUBLICATIONS

Jeffrey G. Andrews et.al, "Fundamentals of WiMAX, Understanding Broadband Wireless Networking," Chapter 10, Pearson Education, Inc., 2007.

(Continued)

*Primary Examiner* — Matthew Gart
*Assistant Examiner* — Peter L Ludwig
(74) *Attorney, Agent, or Firm* — McDonnell Boehnen Hulbert & Berghoff LLP

(57) ABSTRACT

The present invention relates to systems and methods for establishing a data-path between a mobile station and a home access service network gateway ("ASN-GW"). During the authentication process, a visited ASN-GW receives a first message that identifies a home ASN-GW associated with the mobile station. After the mobile station has been authenticated, the visited ASN-GW receives a first data-path request message from a base station serving the mobile station, requesting a path for data-packet communication for the mobile station that extends between base station and the visited ASN-GW. The visited ASN-GW responsively uses the received identification to send a second data-path request message to the home ASN-GW which requests a path for data-packet communication that extends between the base station and the home ASN-GW. Once the data-path has been established, the home ASN-GW may monitor and/or place restrictions on the data being transmitted to and from the mobile stations.

19 Claims, 6 Drawing Sheets

OTHER PUBLICATIONS

WiMAX Forum Network Architecture, "(Stage 2: Architecture Tenets, Reference Model and Reference Points), 3GPP2—WiMAX Interworking," WiMAX Forum, Jan. 11, 2008.

WiMAX Forum Network Architecture, "(Stage 2: Architecture Tenets, Reference Model and Reference Points), Part 1," WiMAX Forum, Jan. 11, 2008.

WiMAX Forum Network Architecture, "(Stage 2: Architecture Tenets, Reference Model and Reference Points), Part 2," WiMAX Forum, Jan. 11, 2008.

WiMAX Forum Network Architecture, "(Stage 2: Architecture Tenets, Reference Model and Reference Points), Part 3—Informative Annex," WiMAX Forum, Jan. 11, 2008.

WiMAX Forum Network Architecture, "(Stage 3: Detailed Protocols and Procedures), Annex: WiMAX—3Gpp2 Interworking," WiMAX Forum, Jan. 11, 2008.

WiMAX Forum Network Architecture, "(Stage 3: Detailed Protocols and Procedures), Annex: Prepaid Accounting," WiMAX Forum, Jan. 11, 2008.

WiMAX Forum Network Architecture, "(Stage 3: Detailed Protocols and Procedures), Annex: R6/R8 ASN Anchored Mobility Scenarios," WiMAX Forum, Jan. 11, 2008.

WiMAX Forum Network Architecture, "(Stage 3: Detailed Protocols and Procedures)" WiMAX Forum, Jan. 11, 2008.

C. Perkins, "IP Mobility Support for IPv4," Request for Comments 3344, Aug. 2002.

* cited by examiner

SYSTEMS AND METHOD FOR ESTABLISHING A DATA-PATH BETWEEN A MOBILE STATION AND A HOME ACCESS SERVICE NETWORK GATEWAY

BACKGROUND

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol. Mobile stations typically conduct wireless communications with one or more base stations, each of which are arranged to send communications to and receive communications from mobile stations over the RF air interface.

Each base station is in turn communicatively connected with a network entity such as a access service network gateway (ASN-GW), which may assist in providing various services, such as service flow authorization, paging, radio resource management, and handover. The ASN-GW may interface with one or more core packet data networks and/or the global Internet. As such, mobile stations can typically communicate over the one or more signaling and/or transport networks from anywhere inside the coverage area of one or more station, via the base station and the ASN-GW.

OVERVIEW

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on.

WiMAX service providers may offer different service plans to their customers to accommodate the customers' needs. For example, some service plans may allow an unlimited amount of data for a higher fee, while other plans may allow a capped amount of data for a lower fee. In addition, some plans may be "family" data plans that apply to a group of WiMAX devices.

The present invention relates to systems and methods for establishing a data-path between a mobile station and a home access service network gateway ("ASN-GW") in a WiMAX network. In an embodiment of the invention, a visited ASN-GW receives a first message from an authentication, authorization, and accounting ("AAA") server. The message includes an identification of a home ASN-GW associated with a mobile station. After the mobile station has been authenticated, the visited ASN-GW receives a first data-path request message from a base station that is serving the mobile station. The first data-path request message requests a path for data-packet communication for the mobile station that extends between base station and the visited ASN-GW. In response to receiving the first data-path request message from the base station, the visited ASN-GW uses the received identification to send a second data-path request message to the home ASN-GW. The second data-path request message requests a path for data-packet communication that extends between the base station and the home ASN-GW. Upon receipt of the data-path request message, the home ASN-GW responsively sends a data-path response message to the base station, establishing that the requested path for data-packet transmission for the mobile station extends between the base station and the home ASN-GW.

Once the data-path has been established, data traffic sent to and from the mobile station travels through the home ASN-GW. As such, the home ASN-GW may monitor the amount of data being sent by the mobile station (or multiple mobile stations belonging to the same account), and perhaps impose charges and/or other penalties on the account associated with the mobile station when the mobile station is transmitting and/or receiving too much data. And many other actions may be taken instead or in addition, based upon the home ASN-GW's monitoring of the data traffic to and/or from the one or more mobile stations.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

An exemplary embodiment of the present invention is described herein with reference to the drawings, in which.

DETAILED DESCRIPTION

Figure 1:
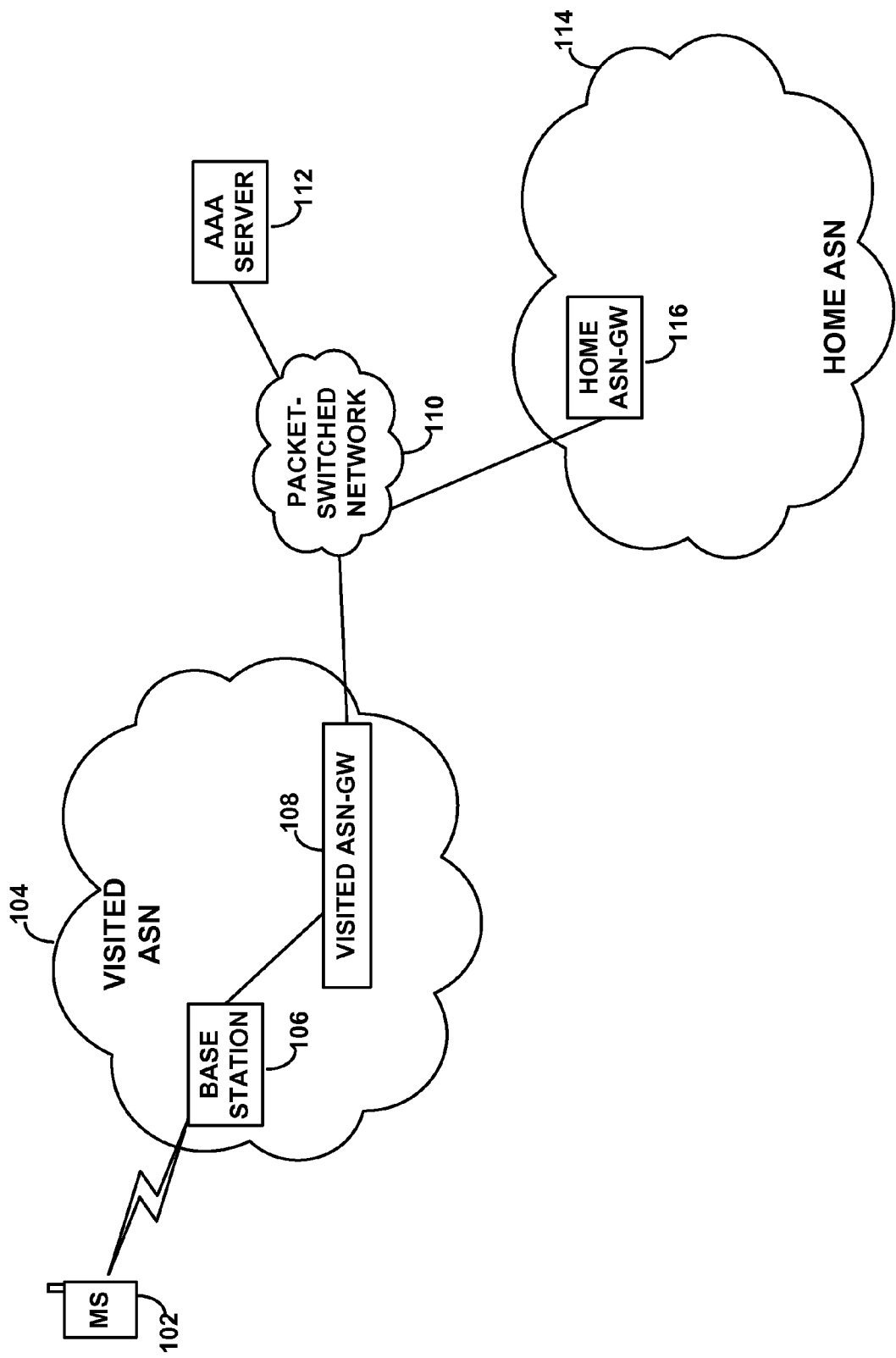
FIG. 1 is a simplified block diagram of a communication system in which an embodiment of the invention can be applied.

Referring to the drawings, FIG. 1 depicts a WiMAX communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine-language instructions stored in data storage and executed by a processor), firmware, and/or hardware.

As shown in FIG. 1, the example WiMAX communication system includes a visited access service network (ASN) 104, a packet-switched network 110, and a home ASN 114. Located on visited ASN 104 is a mobile station 102, a base station 106, and a visited ASN-GW 108. Located on packet-switched network 110 is a AAA server 112. Located on home ASN 114 is a home ASN-GW 116.

Visited ASN 104 and home ASN 114 may provide WiMAX connectivity with mobile station 102, and may manage mobility-related functions, such as handover and mobile-IP foreign-agent support.

Mobile station 102 may be a cell phone, a wirelessly-equipped personal data assistant (PDA), a laptop or any other type of wirelessly-equipped device now known or later developed. Mobile station 102 may be equipped with hardware, software, and/or other logic to communicate using WiMAX.

Base station 106 may include directional antennas, power amplifiers, and associated transceiver equipment arranged to communicate with mobile stations 102 using the WiMAX protocol (and/or other protocols). Base station 106 may be a data path function entity, such as a serving data path function entity, and assist in managing and setting up data-paths needed for data-packet communication between itself and other entities, such as visited ASN-GW 108. Base station 106 may also assist in creating tunnels with various entities for packet forwarding.

Visited ASN-GW 108 may act to block or accept data packets sent to or received from mobile station 102. Visited ASN-GW 108 may also include an authenticator to assist in authenticating mobile station 102 by exchanging extensible authentication protocol (EAP) messages with mobile station 102, base station 106, and/or AAA server 112. In addition, as discussed in greater detail below, visited ASN-GW 108 may assist in establishing a data-path for mobile station 102 that extends between base station 106 and home ASN-GW 116. Visited ASN-GW 108 may be a separate entity on visited ASN 104, or may be incorporated into another entity, such as base station 106 or an ASN-GW located on visited ASN 104 (not shown).

AAA server 112 may be any device capable of (1) determining whether mobile station 102 is authorized to access visited ASN 104 and/or home ASN 114, and (2) identifying a home ASN-GW associated with mobile station 102. AAA server 112 may use protocols such as RADIUS and DIAMETER for communications. AAA server 112 may keep records of a home ASN-GW associated with mobile station 102 in a database. Instead or in addition, AAA server 112 may communicate with another entity in order to identify the home ASN-GW associated with mobile station 102.

Home ASN-GW 116 may assist in providing various WiMAX services, such as AAA, context management, profile management, service-flow authorization, paging, radio-resource management, and handover. In addition, as discussed in greater detail below, home ASN-GW 116 may assist in establishing a data path for mobile station 102 that extends between base station 106 and home ASN-GW 116.

Figure 2:
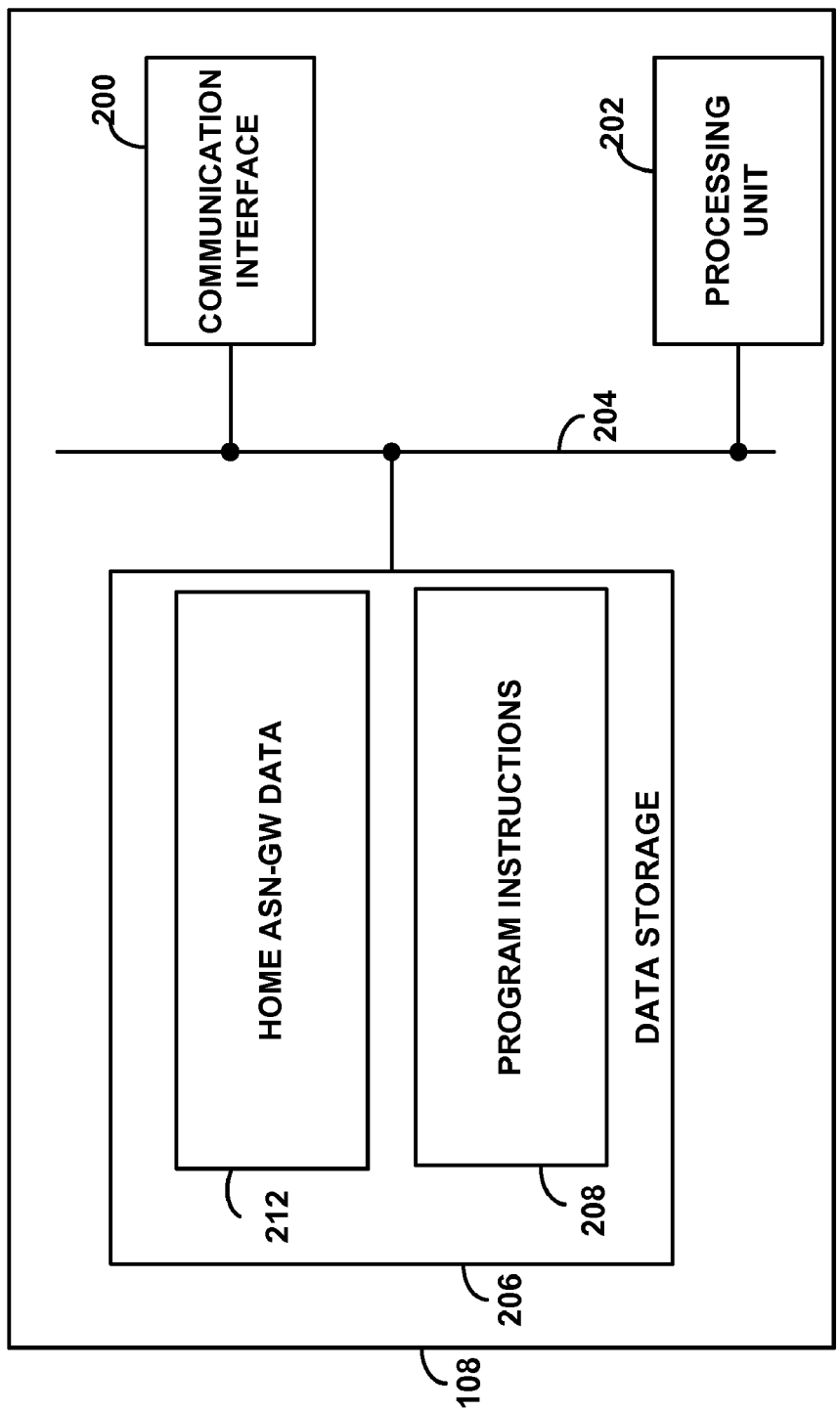
FIG. 2 is a simplified block diagram of a visited ASN-GW arranged to implement aspects of an embodiment.

FIG. 2 is a simplified block diagram depicting functional components of visited ASN-GW 108. As shown, visited ASN-GW 108 includes by way of example a communication interface 200, a processing unit 202, and data storage 206, coupled together by a system bus, network, or other connection mechanism 204.

Communication interface 200 may include one or more communication interface mechanisms that enable the entity to communicate with various other entities. As such, the communication interface may take various well-known forms, depending on factors such as the type of communication links in use.

Processing unit 202 may comprise one or more general-purpose processors (e.g., INTEL processors) and/or one or more specialized processors (e.g., digital signal processors and/or application specific integrated circuits). And data storage 206 may comprise one or more volatile and/or non-volatile storage components, such as optical, magnetic, or organic storage components and may be integrated in whole or in part with processing unit 202.

As shown, data storage 206 may hold program instructions 208 and home ASN-GW data 212. The program instructions 208 may comprise machine-language instructions executable by processing unit 202 to carry out various functions described herein. Home ASN-GW data 212 may comprise an identification of a home ASN-GW associated with mobile station 102.

Figure 3:
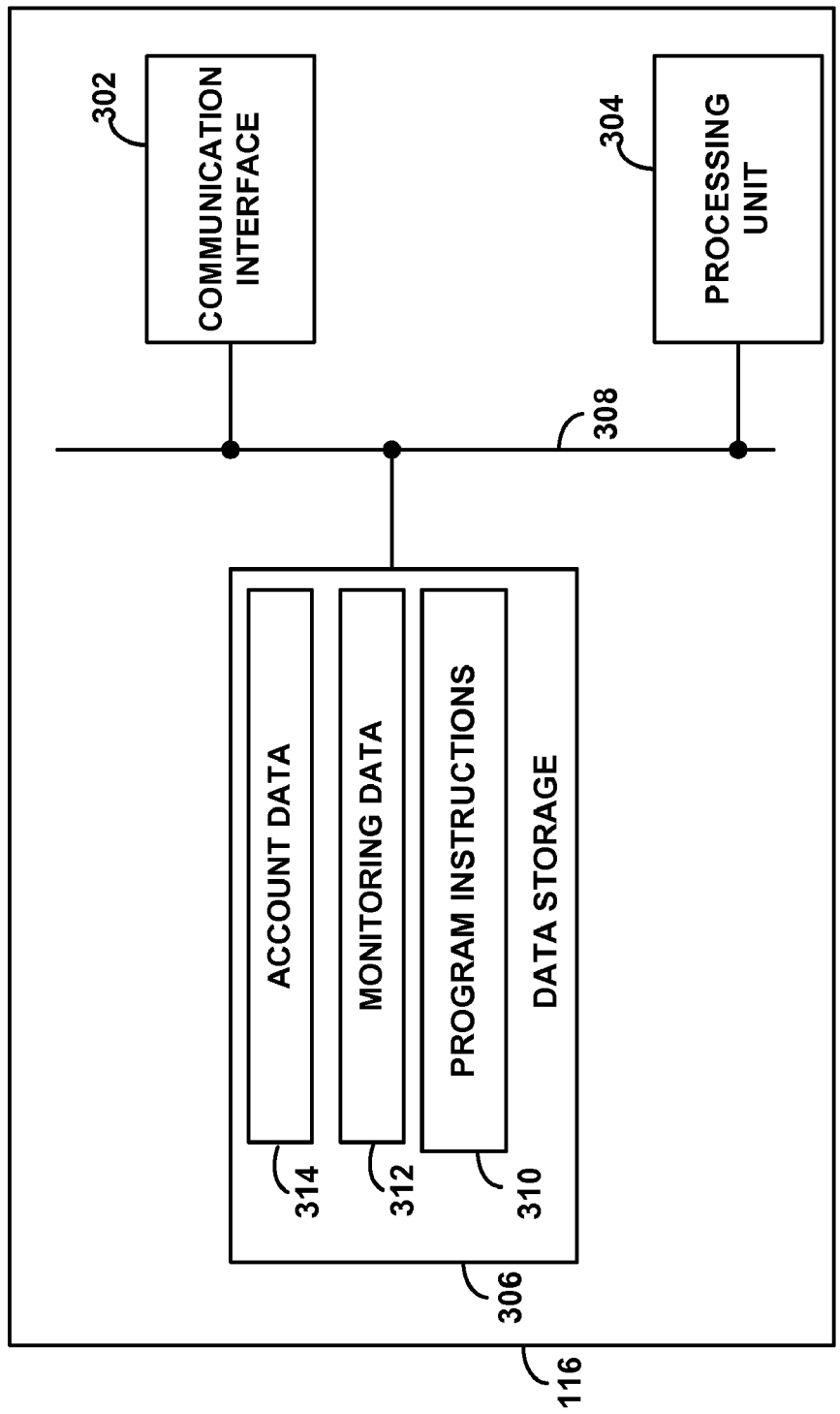
FIG. 3 is a simplified block diagram of a home ASN-GW arranged to implement aspects of an embodiment.

FIG. 3 is a simplified block diagram depicting functional components of home ASN-GW 116. As shown in FIG. 3, home ASN-GW 116 includes by way of example a communication interface 302, a processing unit 304, and data storage 306, coupled together by a system bus, network, or other connection mechanism 308.

Communication interface 302 may include one or more communication interface mechanisms that enable the entity to communicate with various other entities. As such, the communication interface may take various well-known forms, depending on factors such as the type of communication links in use.

Processing unit 304 may comprise one or more general-purpose processors (e.g., INTEL processors) and/or one or more specialized processors (e.g., digital signal processors and/or application specific integrated circuits). And data storage 306 may comprise one or more volatile and/or non-volatile storage components, such as optical, magnetic, or organic storage components and may be integrated in whole or in part with processing unit 304.

As shown, data storage 306 may hold program instructions 310, monitoring data 312, and account data 314. The program instructions 310 may comprise machine-language instructions executable by processing unit 304 to carry out various functions described herein. Monitoring data 312 may comprise an amount of data sent to and/or received from mobile station 102. Account data 314 may include an identification of billable accounts associated with mobile station 102, as well as a set of rules governing those accounts. For example, the set of rules may include a threshold amount of data that mobile station 102 is allowed to send and/or receive during a certain billing cycle. As discussed below, if mobile station 102 exceeds one or more thresholds, home ASN-GW 116 may impose penalties (e.g., charges) on mobile station 102.

Figure 4:
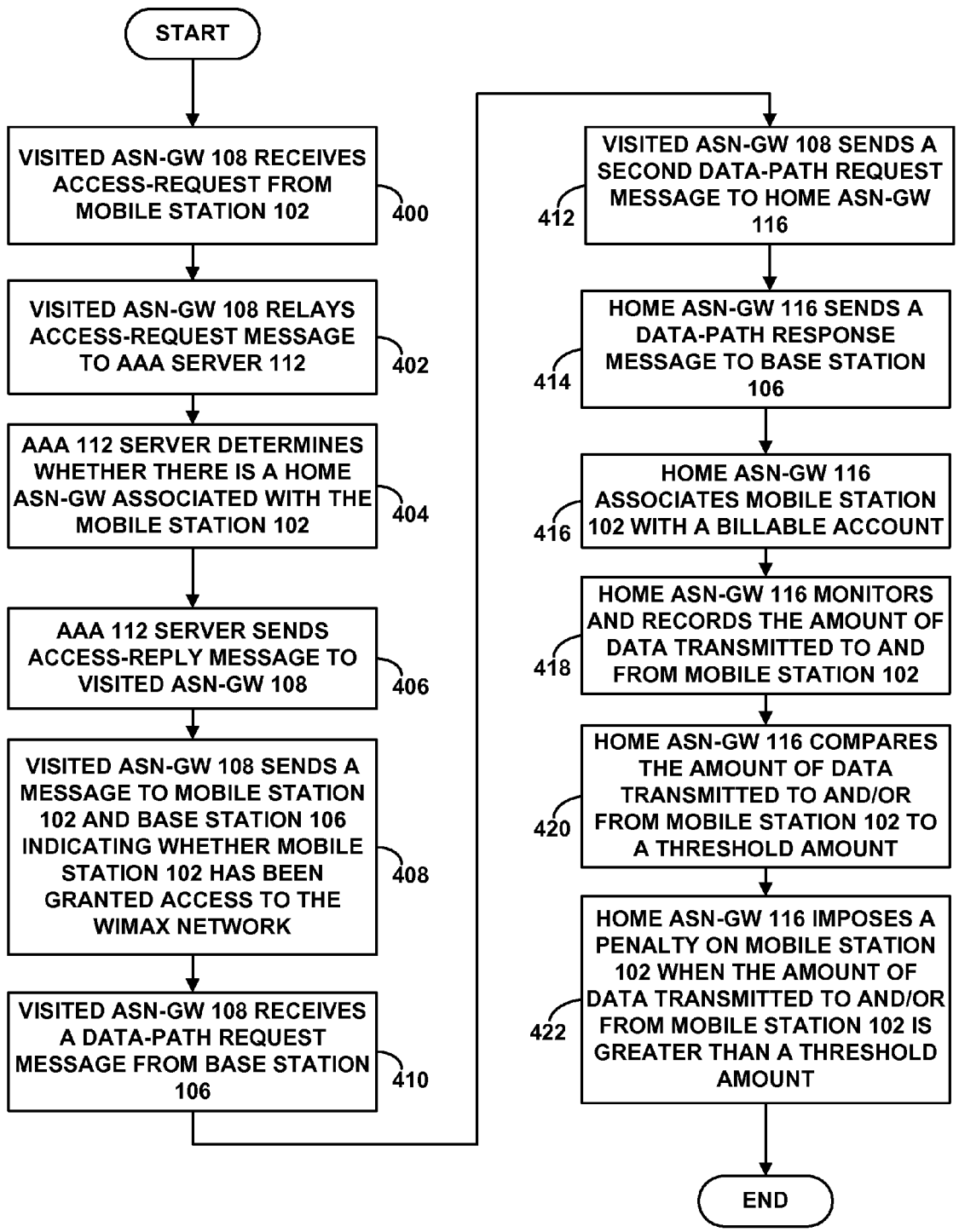
FIG. 4 is a simplified flow chart depicting functions that can be carried out in accordance with an embodiment.

FIG. 4 is a flow chart depicting in summary a set of functions that can be carried out in accordance with the exemplary embodiment. Generally, FIG. 4 depicts a method for establishing a data-path between mobile station 102 and home ASN-GW 116. As shown in FIG. 4, at block 400, visited ASN-GW 108 receives an access-request message from mobile station 102. The access-request message indicates that mobile station 102 is requesting permission to access the WiMAX network. The access-request message may identify the mobile station using its network access identifier (NAI), although other identifiers may be used as well. In addition, the mobile station may send the access-request message using an authentication protocol such as such as privacy and key management version 2 (PKMv2) with EAP, although other protocols may be used as well.

At block 402, visited ASN-GW 108 relays the access-request message to AAA server 112. It should be understood that visited ASN-GW 108 may forward the access-request message from mobile station 102 to AAA server 112, or may generate a new access-request message (for example, using RADIUS), and send that message to AAA server 112.

At block 404, AAA server 112 receives the access-request message, and determines (1) whether mobile station 102 is authorized to access the WiMAX network, and (2) whether there is a home ASN-GW associated with mobile station 102. AAA server 112 may determine this information by querying a database. For example, the database may include a list of mobile station NAIs that are authorized to access the WiMAX network, as well as a list of home ASN-GWs associated with those NAIs. It should be understood that identifiers other than NAIs may be used as well.

At block 406, AAA server 112 sends an access-reply message to visited ASN-GW 108. The access-reply message may indicate whether mobile station 102 is authorized to access the WiMAX network. In addition, the access-reply message may identify a home ASN-GW associated with mobile station 102. Upon receiving the access-reply message, visited ASN-GW 108 may store the home ASN-GW information associated with mobile station 102, for example, in home ASN-GW data 212. At block 408, visited ASN-GW 108 sends a message to mobile station 102 and base station 106 indicating whether mobile station 102 has been granted access to the WiMAX network.

At block 410, visited ASN-GW 108 receives a first data-path request message from base station 106. The first data-path request message requests a path for data-packet communication for mobile station 102 that extends between base station 106 and visited ASN-GW 108. At block 412, in response to receiving the first data-path request message, visited ASN-GW 108 determines whether there is a home ASN-GW associated with mobile station 102 (for example, by querying home ASN-GW data 212). When there is a home ASN-GW associated with mobile station 102, visited ASN-GW 108 sends a second data-path request message to home ASN-GW 116. The second data-path request message requests a path for data-packet communication for mobile station 102 that extends between base station 106 and home ASN-GW 116.

At block 414, in response to the receiving the second data-path request message from visited ASN-GW 108, home ASN-GW 116 responsively sends a data-path response message to base station 106. The data-path response message establishes that the requested path for data-packet transmission for mobile station 102 extends between base station 106 and home ASN-GW 116. Thereafter, all data-packets transmitted to or from mobile station 102 pass through home ASN-GW 116.

At block 416, home ASN-GW 116 associates mobile station 102 with a billable account, and determines whether a fee may be charged to the billable account based on an amount of data transmitted to the mobile station and/or an amount of data transmitted from the mobile station. At block 418, home ASN-GW 116 monitors and records the amount of data transmitted to and/or from mobile station 102 over a period of time (for example, over a billing cycle). At block 420, home ASN-GW 116 compares the amount of data transmitted to and/or from mobile station 102 to a threshold amount, in order to determine whether to penalize the account associated with mobile station 102.

At block 422, if the amount of data transmitted to and/or from mobile station 102 is greater than the threshold amount, home ASN-GW 116 may impose a penalty on mobile station 102. For example, the penalty may comprise sending a simple message (such as a text message) to mobile station 102, warning the user of mobile station 102 that she has exceeded her monthly allotment of data transmission. As another example, the penalty may comprise home ASN-GW 116 blocking the transmission of data to and from the mobile station 102. As yet another example, the penalty may comprise home ASN-GW 116 transmitting data to the mobile station at a reduced data transmission rate.

If there are multiple mobile stations associated with a single billable account (i.e., the account is a family plan), steps 400-416 may be applied for each of those mobile stations, such that a data-path for each mobile station associated with the single billable account extends to the same home ASN-GW. For steps 418-22, the home ASN-GW may monitor and record the collective data transmitted to and/or from all of the mobile stations associated with the single billable account. Consequently, home ASN-GW 116 may determine whether to penalize the account (discussed above with respect to block 420) based on the amount of data transmitted to and/or from all mobile stations associated with the single account.

Figure 5:
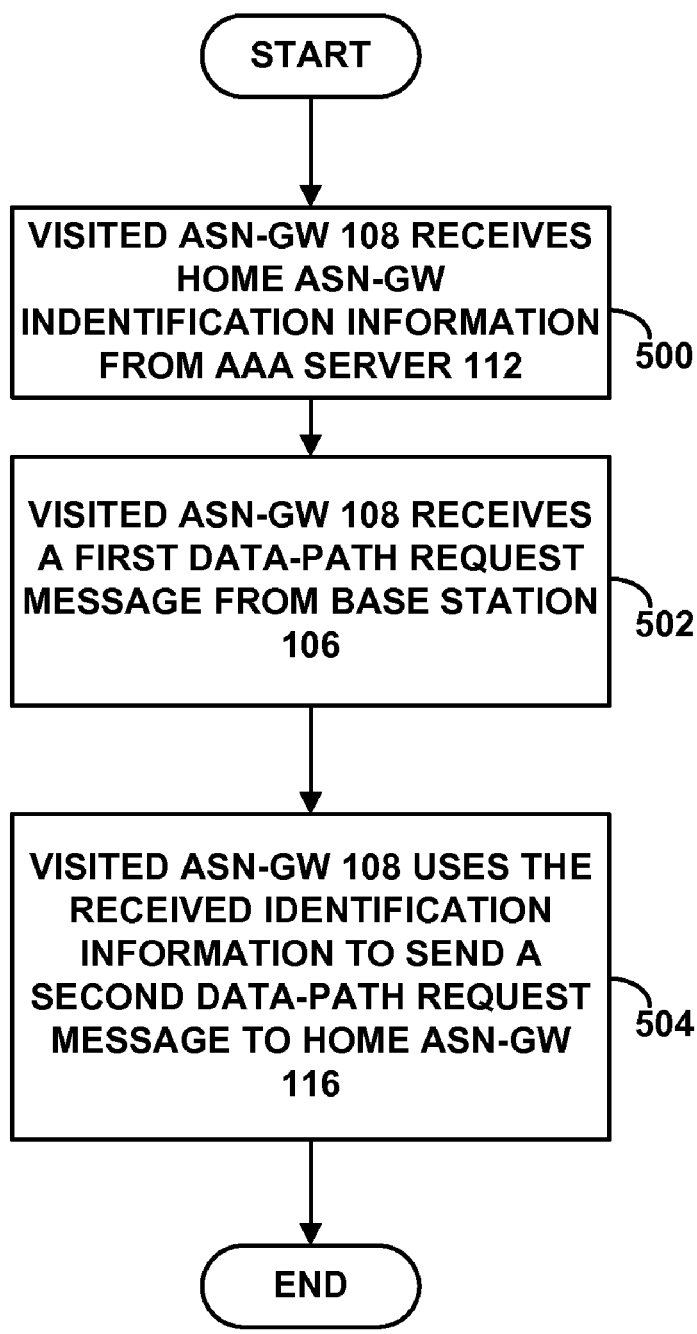
FIG. 5 is a simplified flow chart depicting functions that can be carried out in accordance with an embodiment.

FIG. 5 is a flow chart depicting in summary a set of functions that can be carried out in accordance with the exemplary embodiment. Generally, FIG. 5 depicts a subset of steps described in FIG. 4 that may be carried out by visited ASN-GW 108. As shown in FIG. 5, at block 500, visited ASN-GW 108 receives a first message from AAA server 112. The first message may comprising an identification of a home ASN-GW associated with a mobile station 102 (for example, home ASN-GW 116). Visited ASN-GW 108 may store the received identification information in home ASN-GW data 212. At block 502, visited ASN-GW 108 receives a first data-path request message from base station 106, which is serving the mobile station 102. The first data-path request message requests a path for data-packet communication for mobile station 102 that extends between base station 106 and the visited ASN-GW 108. At block 504, in response to receiving the first data-path request message from base station 106, visited ASN-GW 108 uses the received identification information stored in home ASN-GW data 212 to send a second data-path request message to the home ASN-GW associated with mobile station 102 (in this example, home ASN-GW 116). The second data-path request message requests a path for data-packet communication for mobile station 102 that extends between base station 106 and home ASN-GW 116.

Figure 6:
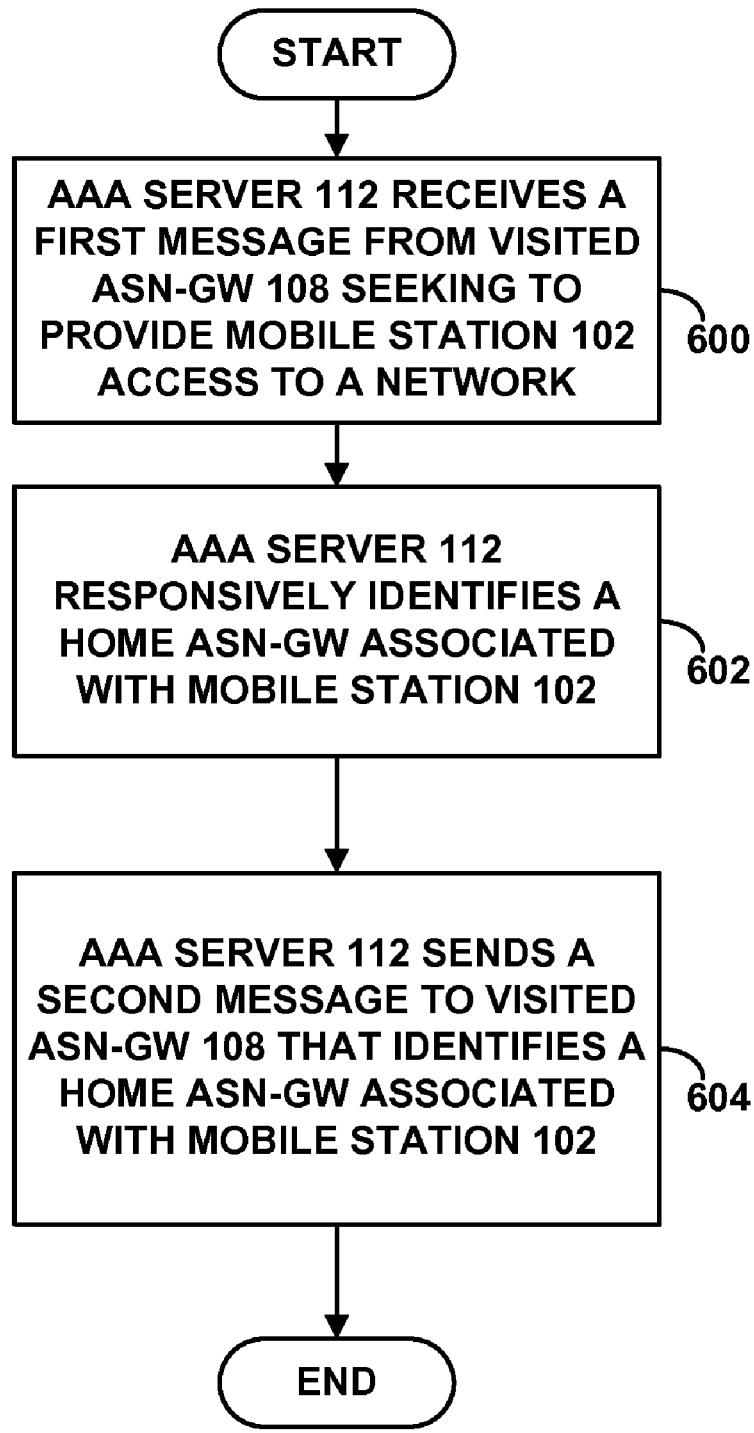
FIG. 6 is a simplified flow chart depicting functions that can be carried out in accordance with an embodiment.

FIG. 6 is a flow chart depicting in summary a set of functions that can be carried out in accordance with the exemplary embodiment. Generally, FIG. 6 depicts a subset of steps described in FIG. 4 that may be carried out by AAA server 112. As shown in FIG. 6, at block 600, AAA server 112 receives a first message from visited ASN-GW 108. The first message seeks to provide mobile station 102 with access to a network. At block 602, in response to receiving the first message, AAA server 112 identifies a home ASN-GW (in this example, home ASN-GW 116) associated with mobile station 102. As described above, AAA server 112 may identify the home ASN-GW by querying a database. At block 604, AAA server 112 sends a message to visited ASN-GW 108. The message may comprise of an identification of the home ASN-GW associated with mobile station 102 (in this example, home ASN-GW 116), as well as an indication of whether mobile station 102 should be granted access to the network.

Example embodiments of the present invention have been described above. Those skilled in the art will understand, however, that changes and modifications may be made to these embodiments without departing from the true scope and spirit of the invention, which is defined by the claims.

We claim:

1. A method for facilitating establishment of a data-path between a mobile station and a home access service network gateway ("ASN-GW"), comprising:
   a visited ASN-GW receiving a first message from an authentication, authorization, and accounting ("AAA") server, the first message comprising an identification of a home ASN-GW associated with a mobile station;
   the visited ASN-GW receiving a first data-path request message from a base station, wherein the base station is serving the mobile station, and wherein the first data-path request message requests a path for data-packet communication for the mobile station that extends between the base station and the visited ASN-GW; and
   in response to receiving the first data-path request message from the base station, the visited ASN-GW using the received identification to send a second data-path request message to the home ASN-GW, wherein the second data-path request message requests a path for data-packet communication for the mobile station that extends between the base station and the home ASN-GW.

2. The method of claim 1, further comprising:
   in response to receiving the second data-path request message from the visited ASN-GW, the home ASN-GW responsively sending a data-path response message to the base station, wherein the data-path response message establishes that the requested path for data-packet transmission for the mobile station extends between the base station and the home ASN-GW.

3. The method of claim 2, further comprising:
   in response to receiving the data-path response message, the base station responsively sending a data-path acknowledgement message to the home ASN-GW, the data-path acknowledgement message acknowledging that the path for data-packet transmission for the mobile station extends between the base station and the home ASN-GW.

4. The method of claim 2, further comprising the home ASN-GW associating the mobile station with a billable account, wherein a fee is charged to the billable account, and wherein the fee is based on at least one of (i) an amount of data transmitted to the mobile station, and (ii) an amount of data transmitted from the mobile station.

5. The method of claim 4, further comprising the home ASN-GW recording an amount of data transmitted to the mobile station.

6. The method of claim 4, further comprising the home ASN-GW recording an amount of data transmitted from the mobile station.

7. The method of claim 4, wherein the fee is based on a total amount of data, wherein the total amount of data comprises (i) an amount of data transmitted to the mobile station, and (ii) an amount of data transmitted from the mobile station.

8. The method of claim 7, further comprising the home ASN-GW sending a message to the mobile station when the total amount of data is more than a threshold amount, wherein the message comprises a notification that the total amount of data is more than the threshold amount.

9. The method of claim 7, further comprising the home ASN-GW blocking the transmission of data to and from the mobile station when the total amount of data is more than a threshold amount.

10. The method of claim 7, further comprising the home ASN-GW transmitting data to the mobile station at a reduced data transmission rate when the total amount of data transmitted to and from the mobile station is more than a threshold amount.

11. A system comprising a visited ASN-GW, wherein the visited ASN-GW is arranged to (i) receive a first message from an authentication, authorization, and accounting ("AAA") server, the first message comprising an identification of a home ASN-GW associated with a mobile station, (ii) receive a first data-path request message from a base station, wherein the base station is serving the mobile station, and wherein the first data-path request message requests a path for data-packet communication for the mobile station that extends between the base station and the visited ASN-GW, and (iii) in response to receiving the first data-path request message from the base station, use the received identification to send a second data-path request message to the home ASN-GW, wherein the second data-path request message requests a path for data-packet communication for the mobile station that extends between the base station and the home ASN-GW.

12. The system of claim 11, wherein the home ASN-GW is arranged to receive the second data-path request message from the visited ASN-GW, and responsively send a data-path response message to the base station, wherein the data-path response message establishes that the requested path for data-packet transmission for the mobile station extends between the base station and the home ASN-GW.

13. The system of claim 12, wherein the home ASN-GW is further arranged to associate the mobile station with a billable account, wherein a fee is charged to the billable account, and wherein the fee is based on at least one of (i) an amount of data transmitted to the mobile station, and (ii) an amount of data transmitted from the mobile station.

14. The system of claim 13, wherein the home ASN-GW is further arranged to record an amount of data transmitted to the mobile station.

15. The system of claim 13, wherein the home ASN-GW is further arranged to record an amount of data transmitted from the mobile station.

16. The system of claim 13, wherein the fee is based on a total amount of data, wherein the total amount of data comprises (i) an amount of data transmitted to the mobile station, and (ii) an amount of data transmitted from the mobile station.

17. The system of claim 16, wherein the home ASN-GW is further arranged to block the transmission of data to and from the mobile station when the total amount of data is more than a threshold amount.

18. The system of claim 16, wherein the home ASN-GW is arranged to transmit data to the mobile station at a reduced transmission rate when the total amount of data is more than a threshold amount.

19. The system of claim 11, wherein the first message further comprises an indication that the mobile station has successfully been authenticated with the AAA server.

* * * * *